Patented May 9, 1933

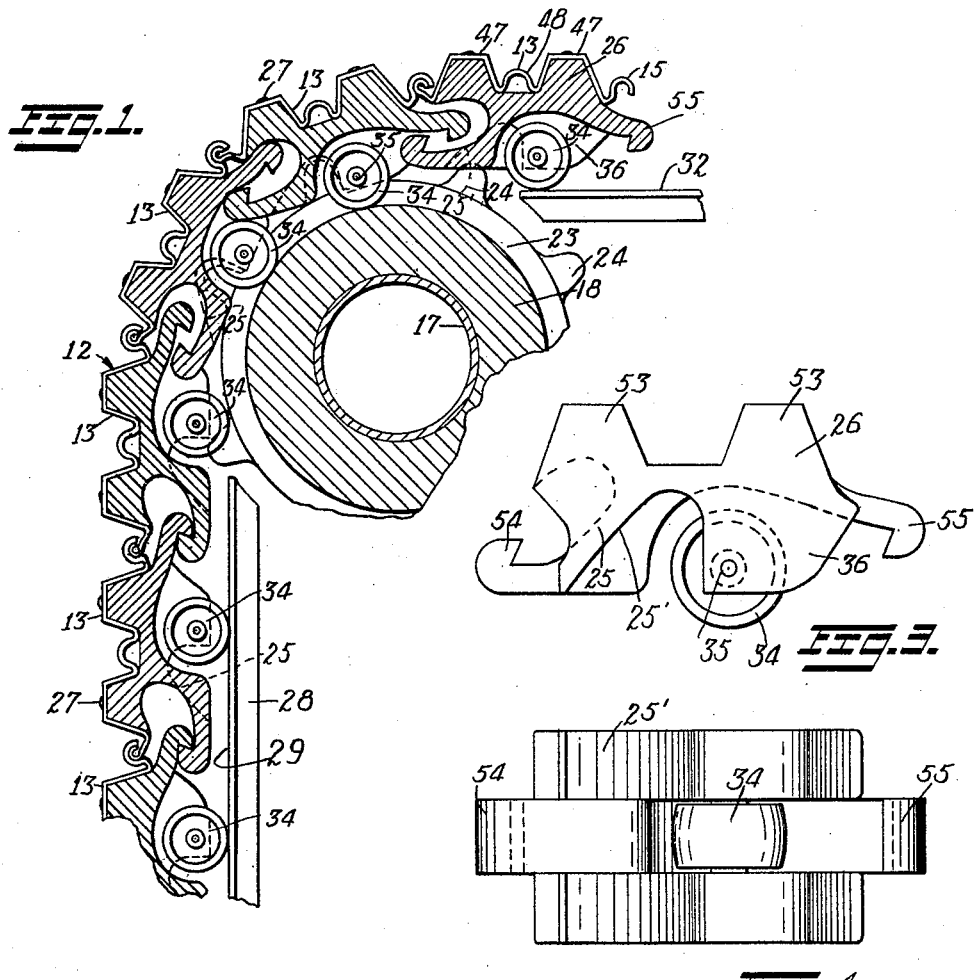

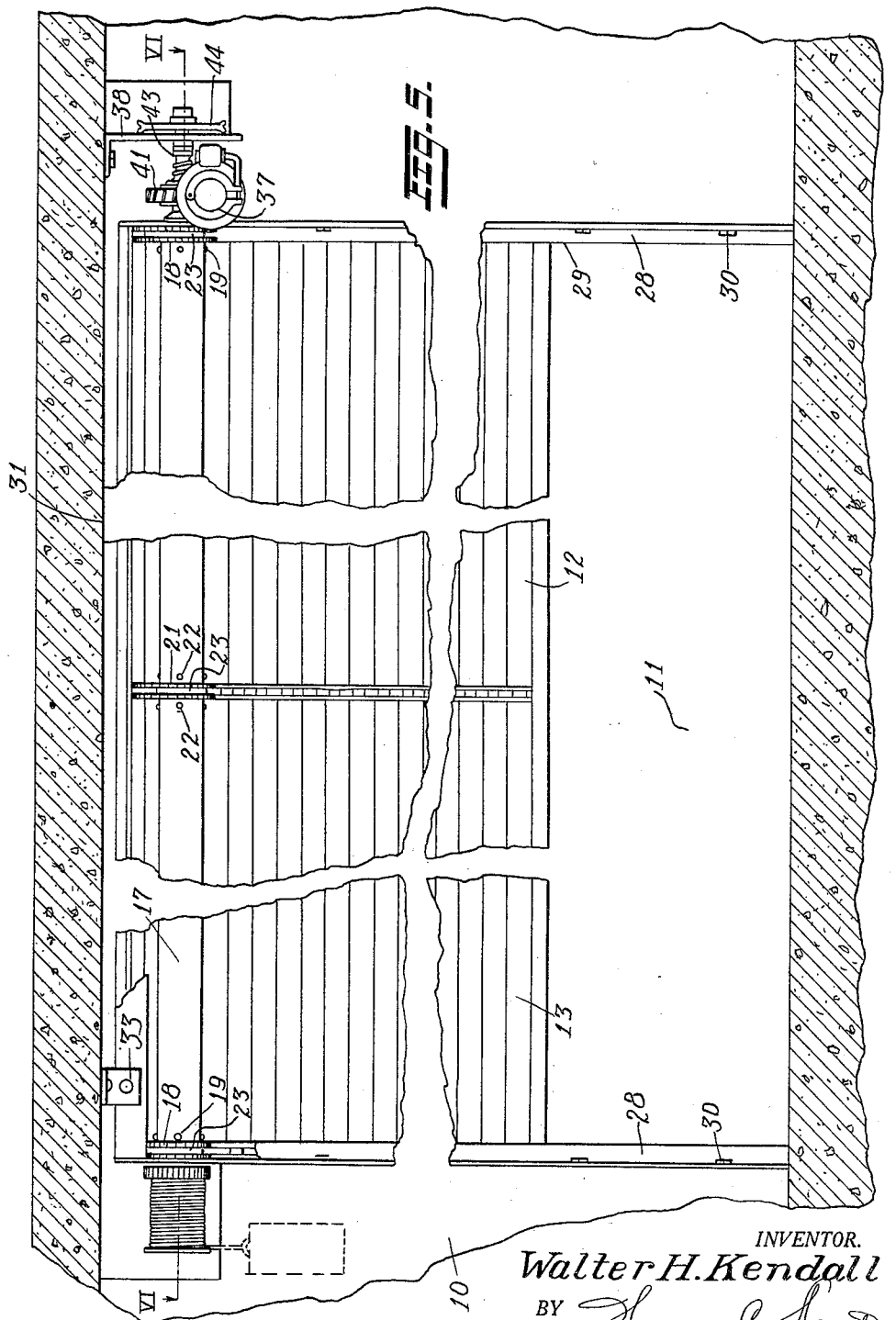

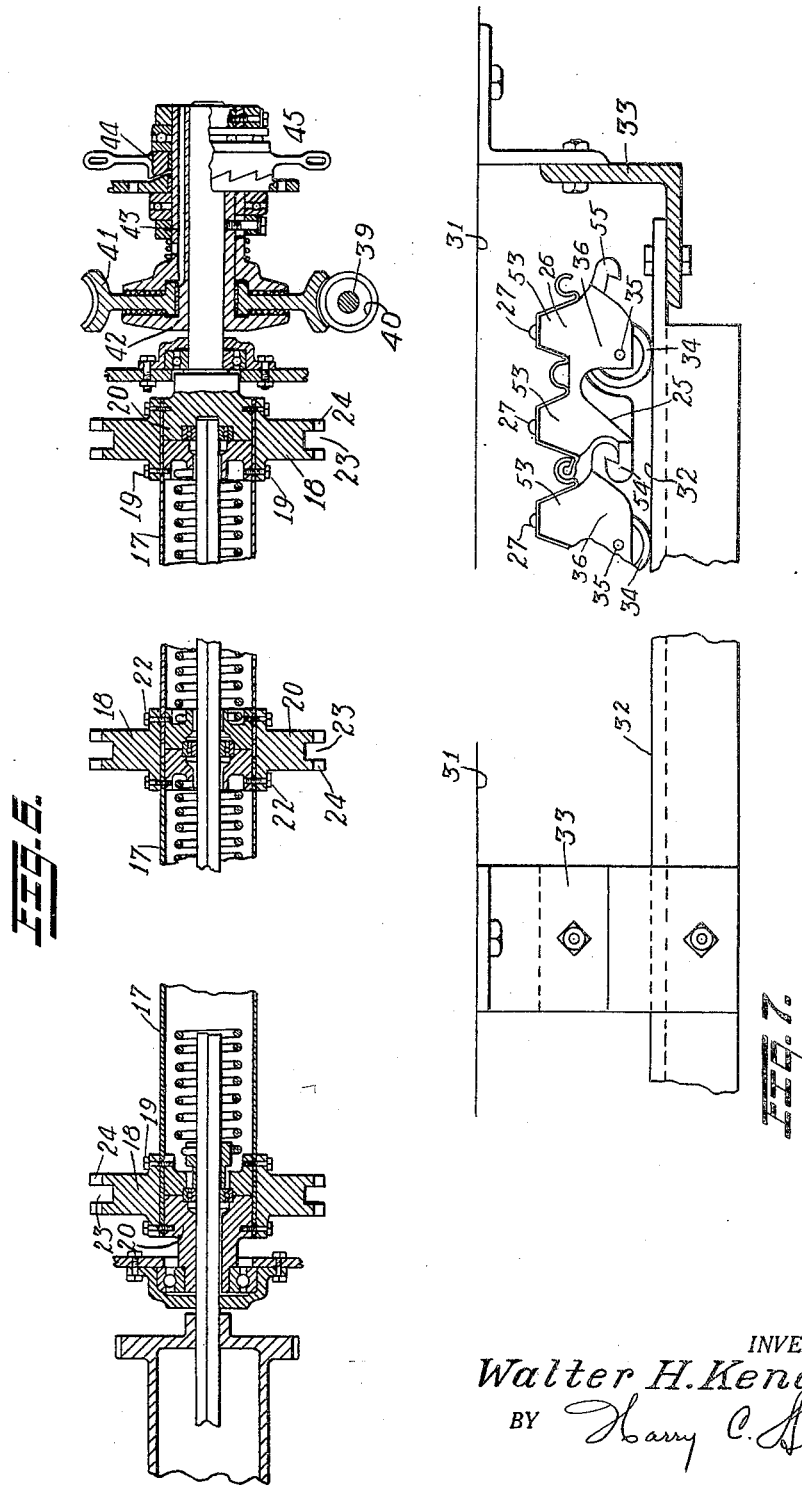

1,908,634

UNITED STATES PATENT OFFICE

WALTER H. KENDALL, OF CHICAGO, ILLINOIS, ASSIGNOR TO NATHAN T. LADENSON, OF EVANSTON, ILLINOIS

FLEXIBLE CURTAIN

Application filed August 4, 1930. Serial No. 473,051.

This invention relates to sliding doors and more particularly to flexible metallic doors or curtains for industrial purposes, although certain features thereof may be employed with equal advantage for other purposes.

It contemplates more especially the provision of flexible curtains for warehouses, elevator shafts and similar situations where closures are of considerable expanse and require power actuation with speed and perfection in operation in order to meet the requirements of commercial practice.

Numerous types of flexible curtains have heretofore been proposed for industrial purposes; however, these have not proven entirely satisfactory owing to their limited expanse required by the inherent inability to withstand appreciable stresses, the forces of the elements, and power driven operation at high speeds. Moreover, known curtains are not adaptable to power operation and succumb to stretch even within standard sizes and under normal operation to the end of impairing or rendering impossible their intended operation. Further, flexible curtains of known construction soon become inoperative or at least defective insofar as enabling their free flexing or movement with the normal application of power contrivances or manual effort. This is especially true of power operated flexible doors, and in consequence thereof such have not met with any recognizable success in spite of the advantages inherent in flexible constructions.

One object of the present invention is to simplify the construction and improve the operation of devices of the character mentioned.

Another object is the provision of a flexible metallic curtain of novel construction which is capable of being power elevated or lowered at high speed.

Still another object is to provide a flexible metallic curtain which is capable of slidable movement to extreme positions with rapidity of ready flexible operation attended with minimum noise and negligible deformation.

A further object is the provision of a flexible curtain capable of movement along a predetermined curved path at high speed and with negligible friction responsive to the traverse thereof.

A still further object is to provide a flexible curtain of large expanse which is possessed of appreciable transverse and longitudinal resistance to stress without impairing the flexibility thereof.

Still a further object is the provision of improved means for rendering a flexible metallic curtain responsive to power driven instrumentalities to effect the displacement thereof along a curved path without stretch or permanent deformation.

An additional object is to provide a flexible metallic curtain having the elements thereof interconnected and reinforced for increased resistance to stress without impairing full freedom of flexibility.

Other objects and advantages will appear from the following description of an illustrative embodiment of the present invention.

In the drawings:

Figure 1 is a sectional view in elevation of a flexible curtain construction embodying features of the present invention.

Figure 2 is a side view in elevation of a curtain element shown assembled in Figure 1.

Figure 3 is a side view in elevation of a curtain element bracket with antifriction means mounted thereon.

Figure 4 is a bottom plan view of the bracket shown in Figure 3.

Figure 5 is a front view in elevation of a door assembly with a flexible curtain mounted thereon.

Figure 6 is a sectional view of the curtain shaft taken substantially along line VI—VI of Figure 5.

Figure 7 is a side view in elevation of a horizontal supporting track for the elevated flexible curtain.

The structure selected for illustration is shown in association with a building wall 10 having a substantially rectangular opening 11 provided therein to define a door-way to an elevator shaft, warehouse or other structure where passage is necessary for industrial or other purposes. In order to effect the closure of the opening 11 to preclude any passage therethrough as well as decrease the fire hazards to a minimum, a flexible door or curtain 12 is arranged for selective association with the opening 11 so as to serve as a partial or complete closure therefor. In the present embodiment, the curtain 12 consists of a transverse series of adjacently disposed elongated elements or slats 13 which extend for substantially the entire breadth of the opening 11.

In order to render the curtain 12 flexible as well as contiguous for the entire depth of the opening 11, the door slats 13 are bent or otherwise shaped along the parallel edges thereof to present flanges 14 and 15 circularly curved to present their complemental association with the corresponding flanges 15 and 14 of the succeeding or adjacent slat 13 which are thus interlocked to impart the desired flexibility thereto. In view of the fact that the flange 14 constitutes a cylindrical edge extension of the slat 13 for pivotal connection with the correspondingly larger opposite edge socket flange 15, the former is telescoped edgewise for axial extension into the latter for assembly of the slats 13 into a flexible metallic curtain 12. The width of the slats 13 and the number thereof so interlocked or combined may be varied within a wide range depending upon extent of the opening 11 and other requirements of each particular installation.

In order to sustain the curtain 12 as well as regulate the elevation or descent thereof, a shaft 17 is transversely disposed within the opening 11 proximate to the top thereof for rotary movement in aligned bearings sustained from the top wall of the opening 11 in any suitable manner as commercial practice may dictate. The exact construction and shaft details may vary within a wide range, and a specific form thereof is more fully shown and described in copending application serially numbered 387,141 filed September 5, 1929. Sprocket wheels 18 are secured to the ends of the shaft 17 by means of studs 19 which extend entirely therethrough to engage hubs 20, thereby effecting a rigid connection therebetween. A similar sprocket 21 or any number thereof depending upon the width of the curtain 12, is disposed between the end sprockets 18 for attachment to the shaft 17 by means of suitable studs 22 in a manner described in connection with sprockets 18.

It is to be noted that the sprocket wheels 18 and 21 are provided with peripheral channels 23 intermediate teeth 24 which extend therefrom on both sides thereof for meshing engagement with similarly shaped complemental lugs or furcations 25 constituting, in this instance, a portion of brackets 26. The brackets 26 are secured to each of the curtain elements 13 by suitable rivets on other fasteners 27, these being spaced in confronting and corresponding relation with the teeth 24 of each of the sprocket wheels 18 and 21. In view thereof, the sprocket wheels 18 and 21 with the teeth 24 in alignment therewith, constitute inter-engaging means for elevation or lowering the curtain 12 responsive to the rotation of the tubular shaft 17 in either direction. In order to guide the curtain 12 along any predetermined path, angle-irons 28 are secured to the side walls of the openings 11 in paired spaced relation to define confronting guide grooves or tracks 29 therebetween to enable the passage of the door or curtain therealong. To this end, the angle-irons 28 defining the channel tracks 29 are in confronting alignment so that the edges of the curtain 12 will be slidable therein to guide the movement thereof.

It is to be noted that the angle-irons 28 are bolted or otherwise secured to the walls of the opening 11 by means of fasteners 30 in the path of the sprocket teeth 24 to slidably guide the curtain 12 thereover and, in this instance, along and just beneath the ceiling 31 of the building structure. To this end, tracks 32 composed of similar angle-irons are supported by suitable brackets 33 for horizontal extension in the path of the sprocket teeth 24. In consequence thereof the tracks 32 are disposed in a direction substantially normal to the tracks 28, thereby permitting the curtain 12 to be elevated or lowered with corresponding movement along the ceiling 31 for support in the tracks 32. In order to reduce the friction to a minimum between the curtain 12 and the tracks 29 and 32 which guide the traverse thereof, rollers 34 are journaled on pins 35 which bridge extensions 36 of the furcations 25 preferably formed integral with brackets 26. Rolling contact between the curtain 12 and the channels 23 of the sprocket wheels 18 and 21 as well as with the tracks 29 and 32 is thus established and maintained throughout the path of its movement, thereby enabling the traverse of the curtain 12 therealong with speed and minimum wear on the coacting surfaces. The brackets 26 are attached at spaced intervals along the curtain slats 13 in confronting relation with the tracks 29 and sprocket channels 23, they being riveted or attached by fasteners 27 to each slat 13 or any number thereof as commercial practice may dictate.

Rotation is imparted to the driving shaft 17 by means of an electrical motor 37 which is mounted, in this instance, upon a ceiling bracket plate 38 proximate to one end of the shaft 17, thereby providing a short driving connection therewith. The armature shaft 39 of the motor 37 carries a worm 40 fitted to the extremity thereof (Figure 6) to mesh with a worm wheel 41 journalled on a sleeve 42 for connection thereto by a clutch mechanism 43 of any suitable construction. A manual clutch control 44 comprising a peripheral member with laterally projecting teeth 45 formed thereon, is journaled on the sleeve 42 so that the curtain 12 may be manually or automatically controlled and operated in a manner more fully described in the aforementioned copending application.

It must be borne in mind that the lateral expanse or width of the curtain 12 may be substantially increased with this arrangement and operation movement to serve as a closure for openings in building structures to meet present and almost universal requirements. Wind pressures and the ability to withstand tensile stretch are factors, however, influencing the limits of curtain expanse. These factors are, however, successfully circumvented by resort to features embodying teachings of the instant invention.

In consequence thereof, the slats 13 are preferably rolled or otherwise shaped to present upstanding nodes 47, in this instance two, which are spaced from each other for separation by a rib 48 impressed in the slats 13 to impart both tensile and bending resistance thereto. As shown, the nodes 47 are preferably flat surfaced as at 49 with the sides 50 and 51 thereof diverging to terminate in the edge flanges 14—15 and intermediary rib 48, respectively. The rib 48 is preferably though not essentially curved to present minute troughs 52 with the sides 51 of the nodes 47 which are of substantially greater depth to impart resistance thereto in a general direction normal to the curtain 12. As a result, wind pressures and the stress of the elements are successfully counteracted even though the expanse of the curtain 12 is unusually large.

Now, then, the tensile strength of the curtain 12 is also increased by the presence of the rib 48; however, the stresses of the character are substantially removed by the association of the brackets 26 which have lugs 53 formed thereon to correspond with the curtain nodes 47, thereby enabling the application thereof to the slats 13 for attachment by the fasteners 27. To relieve the curtain 12 of the tensile tension thereon owing to the interconnected slats 13 responsive to the ascent and descent thereof, the brackets 26 are provided with oppositely directed tongues or hooks 54 and 55 which extend in longitudinal alignment therefrom along a median line between the confronting furcations 25 and continuous extensions 36 on both sides thereof. The furcations or lugs 25 are provided with a groove or cutout 25′ complemental to the teeth 24 on the sprockets 18—21 so that the rollers 34 may ride in the peripheral channel 23 provided therein.

The tongues or hooks 54 and 55 on the brackets 26 are engageable with the opposite tongue or hooks 55 and 54 on the succeeding bracket 26, thereby sustaining the entire tensile stress otherwise existent between the succeeding slats 13 comprising that portion of the curtain 12 which is beneath the shaft 17. In consequence thereof, the edge flange 14 and 15 on the slats 13 merely serve as pivotal points therefor and impart maximum flexibility to the continuous curtain 12 which is weatherproof and provides utmost resistance against wind pressures and the effect of the elements. It is worthy of note that the brackets 26 are inter-engaged only in positions of tension thereon, for during the passage of the slats 13 in the vicinity and over the shaft 17, the tongues or hooks 54 and 55 become disengaged to permit maximum flexibility of the curtain 12.

With the arrangement of parts above described, it is apparent that the curtain 12 may be of considerable expanse in both directions for power movement at high speeds without impairing the flexibility thereof or straining the elements or slats 13 thereof. These are constructed to withstand the effects of the elements and preclude stretch or other deformation responsive to the operation of the curtain 12 over an extended period of time without impairing the desired or necessary flexibility thereof. In industrial installations, door openings sometimes exceed 100 feet in width, and for that reason it is necessary for the curtain 12 to be capable of withstanding immense pressures in a general normal direction. Then, too, the tension between the elements or slats 13 thereof is so great as to ordinarily deform the contour thereof to an extent sufficient to impair flexibility and successful operation.

These defects are remedied with the teachings of the instant invention, and various changes may be made in the embodiment thereof herein specifically described without departing from or sacrificing any advantages of the invention as defined in the appended claims.

I claim:

1. A flexible curtain comprising a series of slats, interengaging means pivotally joining said slats to define a continuous curtain, nodes impressed in said slats from the material thereof to impart increased resistance against deformation, brackets associated with said slats, and interengaging means on said brackets for successive engagement to reinforce said curtain along the length thereof.

2. A flexible curtain comprising a series of slats, interengaging means pivotally joining said slats to define a continuous curtain, nodes impressed in said slats from the material thereof to impart increased resistance against deformation, brackets associated with said slats, and interengaging means on said brackets for successive engagement in certain relative positions of said slats to reinforce said curtain along the length thereof.

3. A flexible curtain comprising a series of slats, interengaging means pivotally joining said slats to define a continuous curtain, nodes impressed in said slats from the material thereof to impart increased resistance against deformation, brackets associated with said slats, and interengaging means on said brackets for successive engagement in certain relative positions of said slats to reinforce said curtain along the length thereof, said brackets being disengageable responsive to the flexing of said curtain for the purpose set forth.

4. The combination with a driving shaft, of a series of slats, interengaging means on said slats to define a continuous flexible curtain, reinforcing means associated with said slats, and intermeshing means on said reinforcing means and shaft to effect a driving relation between said shaft and curtain.

5. The combination with a driving shaft, of a series of slats, interengaging means on said slats to define a continuous flexible curtain, reinforcing means associated with said slats, means for pivotally connecting said reinforcing means to sustain the tension between said slats, and intermeshing means on said reinforcing means and shaft to effect a driving relation between said shaft and curtain.

6. The combination with a driving shaft, of a series of slats, interengaging means on said slats to define a continuous flexible curtain, reinforcing means associated with said slats, means for pivotally connecting said reinforcing means to sustain the tension between said slats, said pivotally connecting means becoming disengaged responsive to the flexing of said curtain past said shaft, and intermeshing means on said reinforcing means and shaft to effect a driving relation between said shaft and curtain.

7. The combination with a driving shaft, of a series of slats, interengaging means on said slats to define a continuous flexible curtain, reinforcing means associated with said slats, means for pivotally connecting said reinforcing means to sustain the tension between said slats, said pivotally connecting means becoming disengaged responsive to the flexing of said curtain past said shaft, intermeshing means on said reinforcing means and shaft to effect a driving relation between said shaft and curtain, and antifriction means on said reinforcing means for improving the traverse of said curtain.

8. A metallic curtain slat comprising an elongated strip of sheet material, edge flanges on said slat for pivotal connection with a complemental slat, ribs impressed in said slats along the length thereof to impart bending resistance thereto in a general normal direction, and interconnectable members attached to said slats to continuously reinforce said curtain along the length thereof.

9. A metallic curtain slat comprising an elongated strip of sheet material, edge flanges on said slat for pivotal connection with a complemental slat, and nodes impressed normally from the plane of said slat for a substantial distance therefrom to impart bending resistance thereto, and brackets complemental to said nodes for slat attachment along said curtain.

10. A metallic curtain slat comprising an elongated strip of sheet material, edge flanges on said slat for pivotal connection with a complemental slat, nodes impressed normally from the plane of said slat for a substantial distance therefrom, and rib impressed in said slat between said nodes, said rib being of comparatively lesser depth to cooperate therewith in reinforcing said slat.

11. A metallic curtain slat comprising an elongated strip of sheet material, edge flanges on said slat for pivotal connection with a complemental slat, nodes impressed normally from the plane of said slat for a substantial distance therefrom, a bracket associated with said slat for lodgement in said nodes to reinforce said slat, and hook means extending longitudinally from said bracket for interengagement with brackets on adjacent slats.

12. A metallic curtain slat comprising an elongated strip of sheet material, edge flanges on said slat for pivotal connection with a complemental slat, nodes impressed normally from the plane of said slat for a substantial distance therefrom, a bracket associated with said slat for lodgement in said nodes to reinforce said slat, hook means extending longitudinally from said bracket for interengagement with brackets on adjacent slat, and means on said bracket to establish a driving relation therewith.

In witness whereof, I subscribe my name.

WALTER H. KENDALL.